United States Patent
Seyama

(10) Patent No.: US 9,560,606 B2
(45) Date of Patent: Jan. 31, 2017

(54) WIRELESS COMMUNICATION SYSTEM, MOBILE STATION, BASE STATION AND WIRELESS COMMUNICATION METHOD

(71) Applicant: FUJITSU LIMITED, Kawasaki-shi, Kanagawa (JP)

(72) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 274 days.

(21) Appl. No.: 13/925,329

(22) Filed: Jun. 24, 2013

(65) Prior Publication Data

US 2013/0281148 A1    Oct. 24, 2013

Related U.S. Application Data

(63) Continuation of application No. PCT/JP2010/073806, filed on Dec. 28, 2010.

(51) Int. Cl.
*H04W 52/36* (2009.01)
*H04W 52/24* (2009.01)
*H04W 52/30* (2009.01)

(52) U.S. Cl.
CPC ......... *H04W 52/367* (2013.01); *H04W 52/243* (2013.01); *H04W 52/30* (2013.01)

(58) Field of Classification Search
CPC ... H04W 52/243; H04W 52/30; H04W 52/367
See application file for complete search history.

(56) References Cited

U.S. PATENT DOCUMENTS

| | | |
|---|---|---|
| 7,961,695 B2 | 6/2011 | Fukuoka et al. |
| 8,107,987 B2 | 1/2012 | Malladi et al. |
| 8,442,574 B2 | 5/2013 | Kashiwase et al. |

(Continued)

FOREIGN PATENT DOCUMENTS

| | | |
|---|---|---|
| CN | 101778462 A | 7/2010 |
| EP | 2 498 546 A1 | 9/2012 |

(Continued)

OTHER PUBLICATIONS

3GPP TR 36.814 V9.0.0, "Evolved Universal Terrestrial Radio Access (E-UTRA); Further advancements for E-UTRA physical layer aspects," Mar. 2010, 104 pages.

(Continued)

*Primary Examiner* — Lewis West
(74) *Attorney, Agent, or Firm* — Arent Fox LLP

(57) ABSTRACT

In a wireless communication system capable of wireless communication by using multiple frequency bands at the same time, a mobile station includes an uplink transmitting unit, which transmits allowable power difference between frequency bands and limitation node information indicating an object of power limitation in transmission power control of the mobile station to a base station, and a transmission-power control unit, which controls transmission power on the basis of a TPC command received from the base station, and the base station includes a TPC-command generating unit, which generates a TPC command on the basis of the allowable power difference between frequency bands and the limitation mode information, and a transmitting unit, which transmits the TPC command to the mobile station.

5 Claims, 16 Drawing Sheets

(56) References Cited

U.S. PATENT DOCUMENTS

| | | |
|---|---|---|
| 2008/0220806 A1 | 9/2008 | Shin et al. |
| 2010/0075689 A1 | 3/2010 | Uemura et al. |
| 2010/0197339 A1* | 8/2010 | Pedersen ............... H04W 52/34 455/522 |
| 2010/0208603 A1* | 8/2010 | Ishii ..................... H04B 1/7113 370/252 |
| 2011/0081936 A1* | 4/2011 | Haim .................. H04W 52/367 455/522 |
| 2012/0063398 A1 | 3/2012 | Hamaguchi et al. |

FOREIGN PATENT DOCUMENTS

| | | |
|---|---|---|
| JP | 2008-35290 A | 2/2008 |
| JP | 2010-518786 A | 5/2010 |
| JP | 2010-520711 A | 6/2010 |
| JP | 2010-166587 A | 7/2010 |
| JP | 2012-525081 A | 10/2012 |
| WO | WO 2008/084859 A1 | 7/2008 |
| WO | WO 2010/103862 A1 | 9/2010 |
| WO | WO 2010/124192 A2 | 10/2010 |
| WO | WO 2010/146972 A1 | 12/2010 |

OTHER PUBLICATIONS

3GPP TR 36.815 V9.1.0, "Further advancements for E-UTRA; LTE-Advanced feasibility studies in RAN WG4," Jun. 2010, 29 pages.
3GPP TSG RAN WGI Meeting #59bis, "UL Power Control in Carrier Aggregation," Valencia, Spain, Jan. 18-22, 2010, 2 pages.
International Search Report issued in PCT/JP2010/073806, mailed Feb. 8, 2011, 8 pages.
Huawei, "UL Power Control in Carrier Aggregation," 3GPP TSG RAN WG1 Meeting #59bis, Valencia, Spain, Jan. 18-22, 2010, 5 pages.
Office Action issued in Japanese Application No. 2012-550646, mailed Mar. 11, 2014, with English translation, 10 pages.
Extended European Search Report of European Patent Application No. 10861518.8 dated Dec. 7, 2015.

* cited by examiner

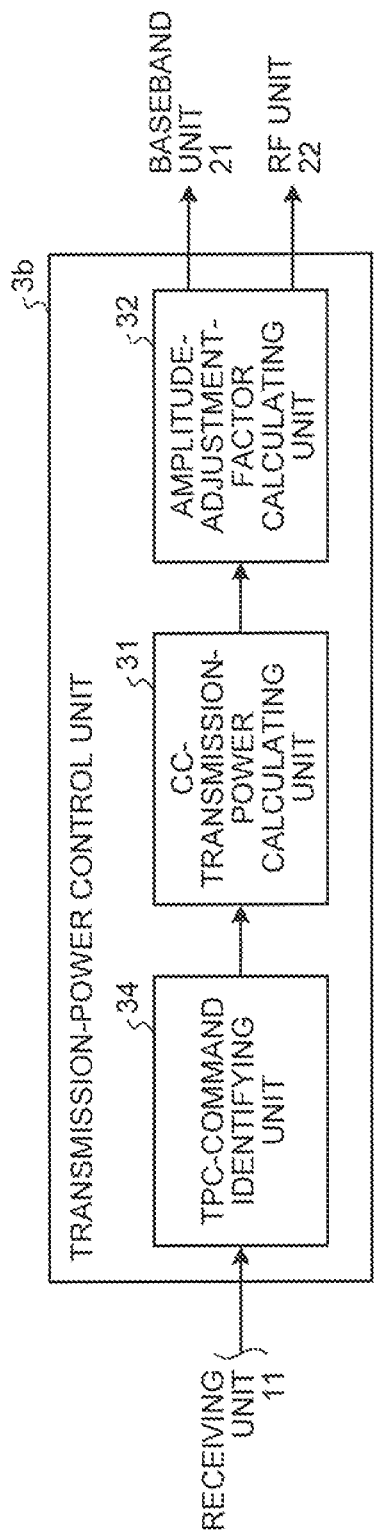

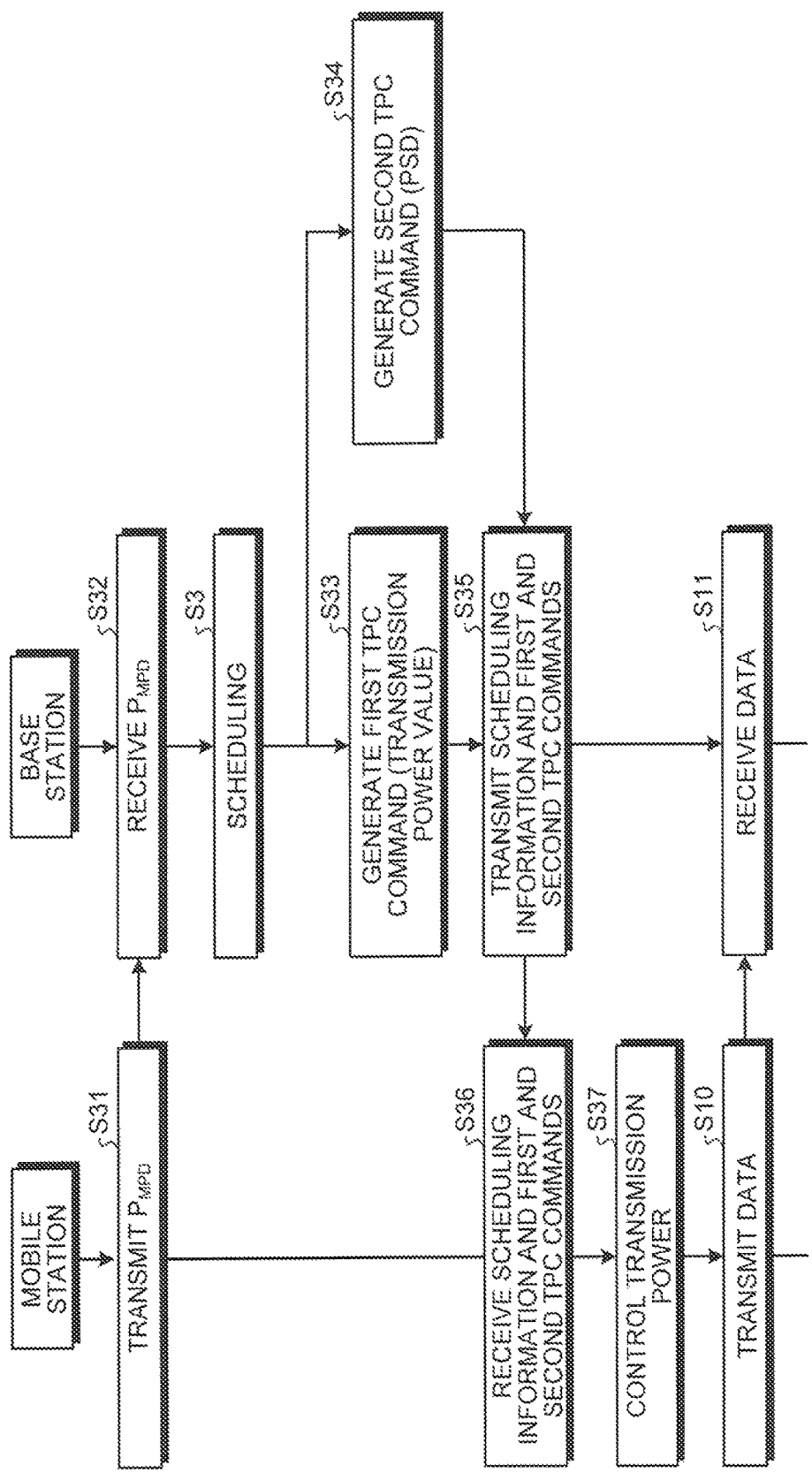

WIRELESS COMMUNICATION SYSTEM, MOBILE STATION, BASE STATION AND WIRELESS COMMUNICATION METHOD

CROSS-REFERENCE TO RELATED APPLICATION

This application is a continuation application of International Application PCT/JP2010/073806, filed on Dec. 28, 2010, and designating the U.S., the entire contents of which are incorporated herein by reference.

FIELD

The present invention relates to a wireless communication, system capable of communication by using multiple frequency carriers at the same time, a mobile station, a bass station, and a wireless communication method.

BACKGROUND

In LTE-A (Long Term Evolution-Advanced), Carrier Aggregation (CA) is introduced as a technology capable of transmitting a larger volume of data. In CA, a mobile station (US) and a base station (eNB) perform data transmission and reception using multiple LTE wireless carriers called Component Carriers (CCs).

When the data transmission and reception is performed by CA, the mobile station is assigned a frequency resource of good radio quality with respect to each CC by frequency scheduling. Therefore, in CA, an amount of frequency resource assigned may differ among the CCs.

Furthermore, in CA, independent TPC (Transmission Power Control) with respect to each CC is possible. Therefore, a transmission power value and PSD (Power Spectral Density) of each CC may differ among the CCs.

Non Patent Document 1: 3GPP TB36.814, "Further advancements for E-UTRA physical layer aspects (Release9)", V9.0.0 (March 2010)

However, a conventional wireless communication system into which the above-described CA is introduced has the following problems.

In the conventional wireless communication system, a mobile station calculates a transmission power value of each CC on the basis of a TPC command transmitted from a base station. Then, the mobile station converts a difference in transmission power value between CCs into an amplitude ratio, and adjusts the amplitude of each CC on the basis of the amplitude ratio. Therefore, for example, when there is a large difference in transmission power value between CCs and the mobile station performs the amplitude adjustment based on a CC having she maximum transmission power value, an amplitude level of a signal of a CC having a small transmission power value is lowered, and a quantization error is increased. As a result, there is a problem that the signal quality of a CC having a small transmission power value is degraded.

On the other hand, when the mobile station performs the amplitude adjustment based on a CC having the minimum transmission power value to avoid degradation of the signal quality of a CC having a small transmission power value, an amplitude level of a signal of a CC having a large transmission power value is increased, and overflow occurs in a on converter. Namely, there is a problem that this overflow may cause degradation of the signal quality and unwanted out-of-band signal interference.

Furthermore, measures against the overflow could include a measure to increase a quantization bit rate; however, when this measure is implemented, there are problems that the circuit scale of the DA converter is increased, and further, power consumption is increased due to the increase in the circuit scale.

SUMMARY

According to an aspect, in a wireless communication system capable of wireless communication by using multiple frequency bands at the same time, a mobile station includes: an uplink transmitting unit that transmits allowable power difference between frequency bands and mode information indicating an object of power limitation in transmission power control of the mobile station to the base station; and a transmission-power control unit that controls transmission power on the basis of a transmission power control command received from the base station, and a base station includes: a generating unit that generates a transmission power control command on the basis of the allowable power difference between frequency bands and the mode information; and a downlink transmitting unit that transmits the transmission power control command to the mobile station.

The object and advantages of the invention will foe realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 20 is a diagram illustrating a configuration example of a transmission-power control unit.

FIG. 21 is a flowchart illustrating an example of a wireless communication method in a wireless communication system according to a third embodiment.

DESCRIPTION OF EMBODIMENTS

Embodiments of a wireless communication system, mobile station, base station, and wireless communication method disclosed, in the present application will be explained in detail below on the basis of drawings. Incidentally, this invention, is not limited to these embodiments.

First Embodiment

Figure 1:
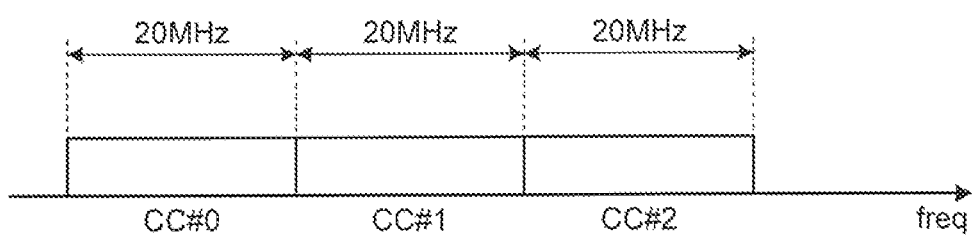
FIG. 1 is a diagram illustrating an example of carrier aggregation.
Figure 2:
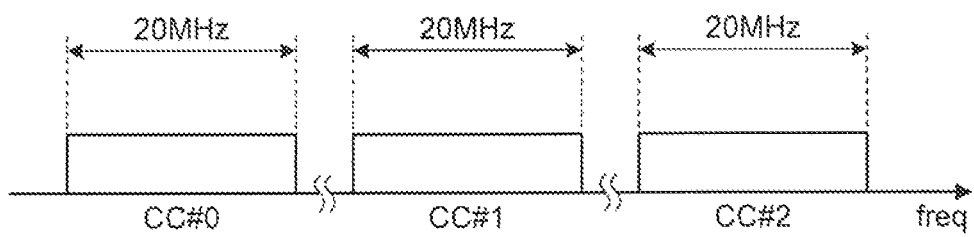
FIG. 2 is a diagram illustrating an example of carrier aggregation of non-contiguous component carriers.

In 3GPP (3rd Generation Partnership Project), LTE-A has been discussed as a developed form of LTE. In LIE-A, to achieve high-speed communication, a technology of aggregating multiple wireless carriers of an LTE system and transmitting a larger volume of data by using the aggregated band is introduced. This is called Carrier Aggregation (CA). FIG. 1 is a diagram illustrating an example of CA. In FIG. 1, each of LTE wireless carriers aggregated is referred to as a Component Carrier (CC). In LTE-A, for example, a mobile station (UE) and a base station (eNB) perform data transmission and reception using multiple CCs. Here, as an example, there is illustrated a case where communication is performed by using three CCs (CC #0, CC #1, CC #2) with a bandwidth of 20 MHz. Incidentally, in FIG. 1, there is illustrated a case where communication is performed by using contiguous frequency bands of CCs; however, in CA, communication can be performed by using non-contiguous frequency bands of CCs, for example, as illustrated in FIG. 2. FIG. 2 is a diagram illustrating an example of CA of non-contiguous CCs.

Figure 3:
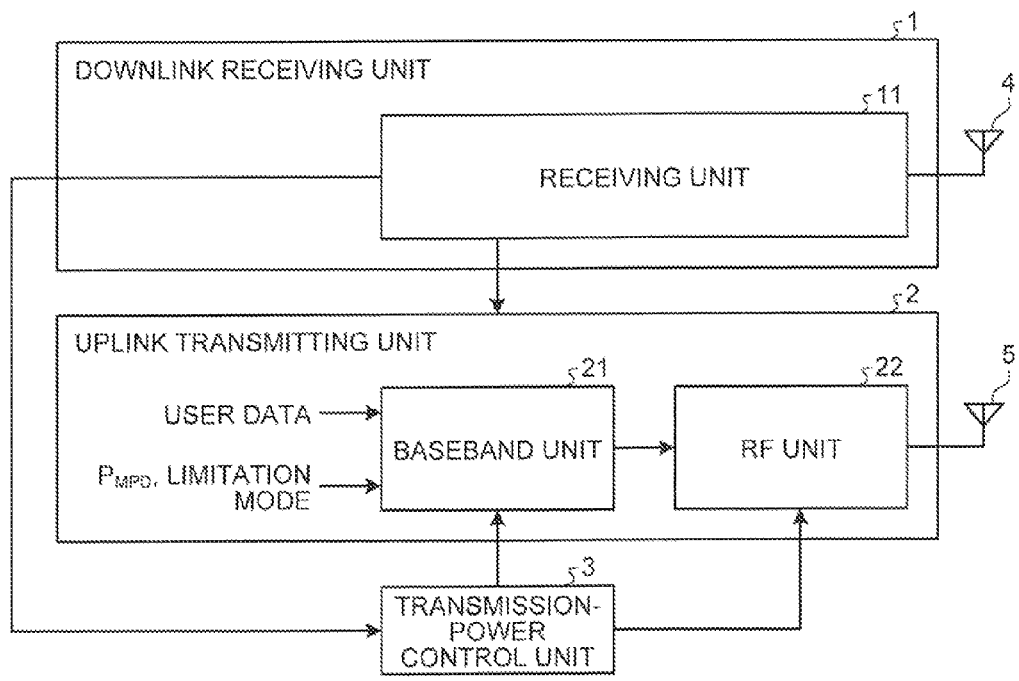
FIG. 3 is a diagram illustrating a configuration example of a mobile station.
Figure 4:
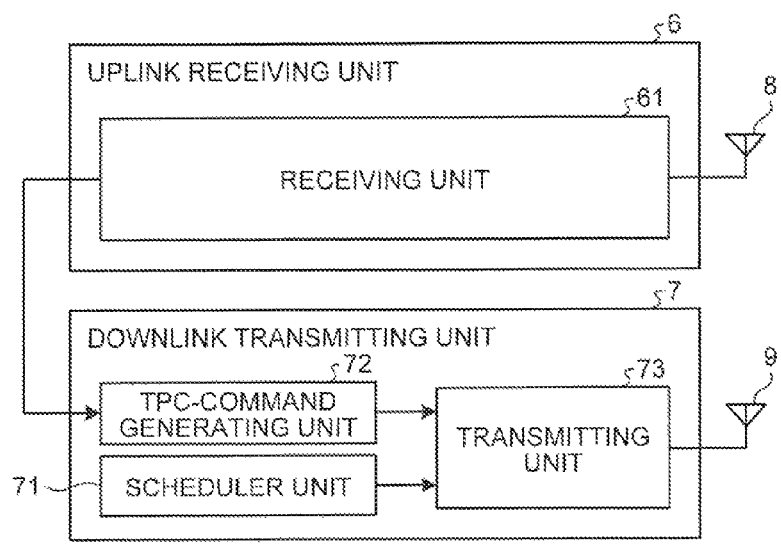
FIG. 4 is a diagram illustrating a configuration example of a case station.

A wireless communication system, according to a first embodiment that performs data transmission by CA is explained below. FIG. 3 is a diagram illustrating a configuration example of a mobile station in the wireless communication system, and FIG. 4 is a diagram illustrating a configuration example of a base station in the wireless communication system. Incidentally, for convenience of the explanation, the configuration examples of the mobile station and the base station represent a list of components involved in a process in the present embodiment, and are not representation of all functions of the mobile station and the base station.

In FIG. 3, the mobile station, includes a downlink receiving unit 1, an uplink transmitting unit 2, and a transmission-power control unit 3, in the downlink receiving unit 1, a receiving unit 11 notifies the transmission-power control unit 3 of a TPC command received from the base station via an antenna 4, and notifies the uplink transmitting unit 2 of scheduling information received from the base station via the antenna 4. The uplink transmitting unit 2 includes a baseband unit 21 and an BP (Radio Frequency) unit 22, and encodes user data assigned to given CCs on the basis of the scheduling information, a maximum power difference $P_{MPD}$ between the CCs, and limitation mode information and transmits the encoded data to the base station via an antenna 5.

Figure 5:
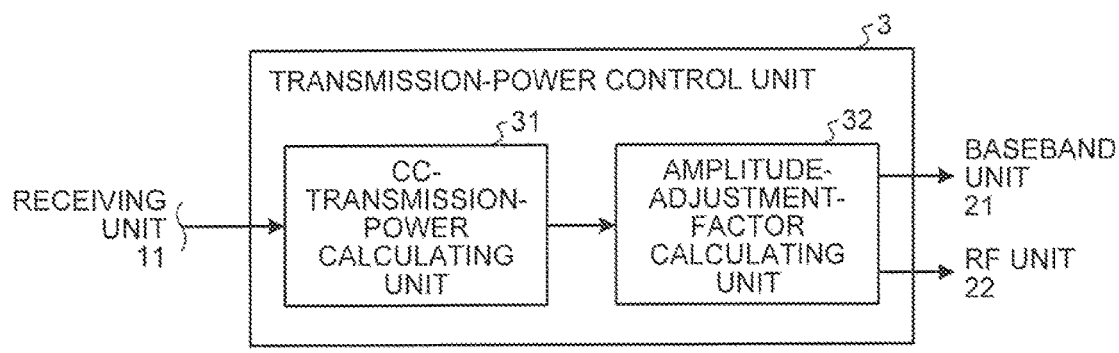
FIG. 5 is a diagram illustrating a configuration example ox a transmission-power control unit.

The transmission-power control unit 3 controls transmission power on the basis of the TPC command notified from the base station. FIG. 5 is a diagram illustrating a configuration example of the transmission-power control unit 3. In FIG. 5, the transmission-power control unit 3 includes a CC-transmission-power calculating unit 31 and an amplitude-adjustment-factor calculating unit 32. The CC-transmission-power calculating unit 31 calculates a transmission power value of each CC on the basis ox a TPC command. The amplitude-adjustment-factor calculating unit 32 calculates an amplitude adjustment factor (an amplitude ratio) from a ratio of respective transmission power values of CCs or a ratio of respective PSD of transmission power valves of CCs, and notifies the baseband unit 21 of a result of the calculation. Furthermore, the amplitude-adjustment-factor calculating unit 32 calculates total power which is the sue of respective transmission power values of all CCs, and entities the RF unit 22 of a result of the calculation, namely, the transmission-power control unit 3 controls transmission power of each CC on the basis of the amplitude adjustment factor and total power of all CCs obtained by the calculations.

Incidentally, in the above-described mobile station, the downlink receiving unit 1, the uplink transmitting unit 2, and the transmission-power control unit 3 can be composed of, for example, a CPU (Central Processing Unit), an FPGA (Field Programmable Gate Array), and a memory, etc.

In FIG. 4, the base station includes an uplink receiving unit 6 and a downlink transmitting unit 7, in the uplink receiving unit 6, a receiving unit 61 receives a maximum power difference $P_{MPD}$ between CCs and limitation mode information transmitted from the mobile station via an antenna 8, and notifies the downlink transmitting unit 7 of the decoded maximum power difference $P_{MPD}$ between CCs and the decoded limitation mode information. In the downlink transmitting unit 7, a scheduler unit 71 performs scheduling on she basis of a result of measurement of communication quality based on an SRS (Sounding Reference Signal). Furthermore, a TPC-command generating unit 72 generates a TPC command on the basis of the decoded maximum power difference $P_{MPD}$ between CCs and the decoded limitation mode information. Then, a transmitting unit 73 performs OFDM (Orthogonal Frequency Division Multiplexing) modulation on the TEC command and scheduling information, and transmits an OFDM signal via an antenna 9. Incidentally, in the above-described base station, the uplink receiving unit 6 and the downlink transmitting unit 7 can be composed of, for example, a CPU, an FPGA, and a memory, etc.

Figure 6:
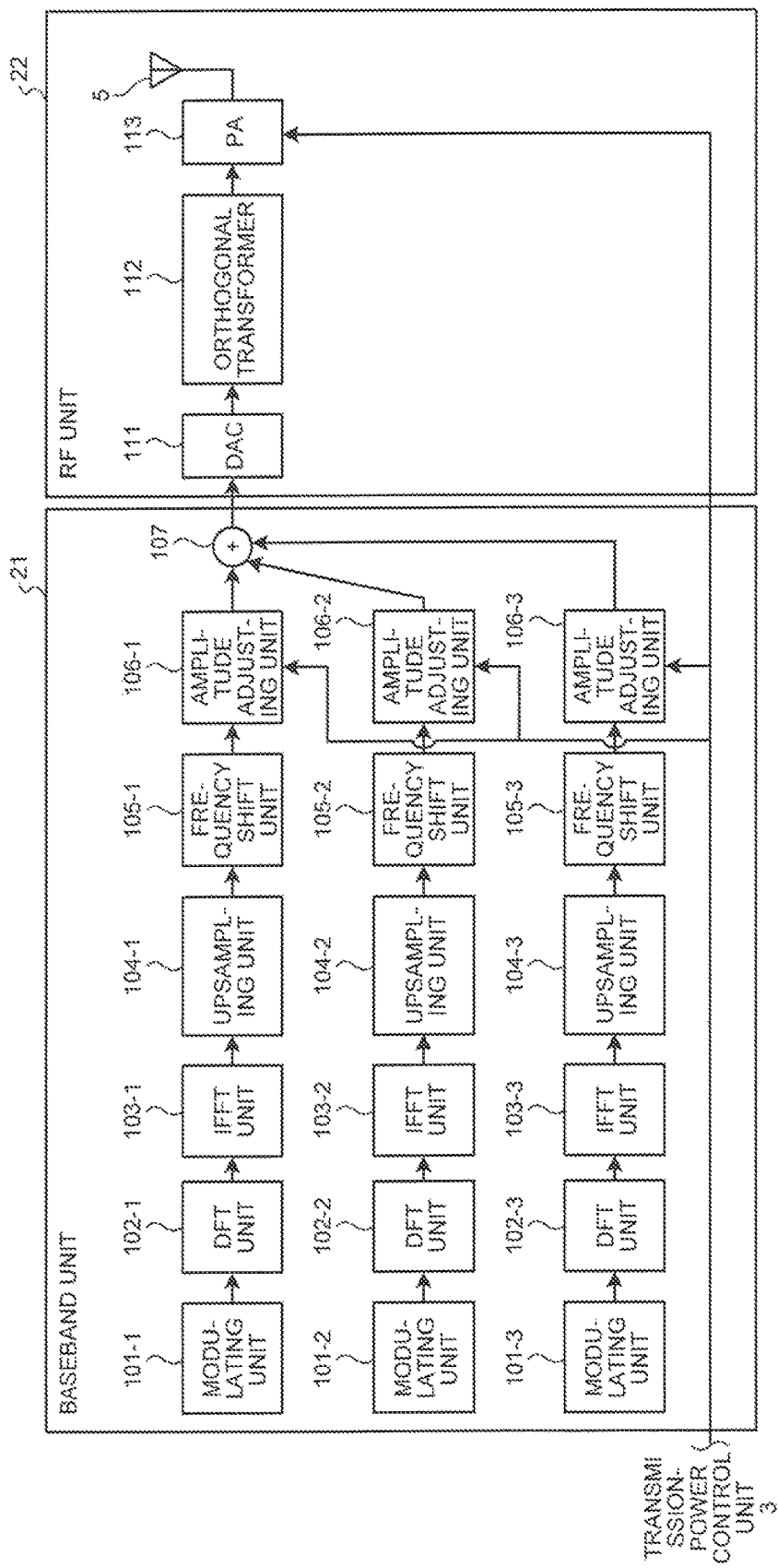
FIG. 6 is a diagram, illustrating an example of configurations of a baseband unit and an RF unit.

Here, the operations of the baseband unit 21 and the RF unit 22 in the mobile station are explained. FIG. 6 is a diagram illustrating an example of configurations of the baseband unit 21 and the RF unit 22.

In the baseband unit 51, modulating units 101-1, 101-2, and 101-3 individually modulate data of a corresponding CC (user data, a maximum power difference $P_{MPD}$ between CCs, and limitation mode information, etc.). DFT (Discrete Fourier Transform) units 102-1, 102-2, and 102-3 implement discrete Fourier transform on a modulation symbol, thereby converting a time domain signal into a frequency domain signal. IFFT (Inverse Fast Fourier Transform) units 103-1, 103-2, and 103-3 perform inverse fast Fourier transform to convert a frequency domain signal into a time domain, signal. Upsampling units 104-1, 104-2, and 104-3 increase a sampling rate of a signal of a corresponding CC. Frequency shift units 105-1, 105-2, and 105-3 shift an upsampled signal of a corresponding CC to a desired frequency band. After that, amplitude adjusting units 106-1, 106-2, and 106-3 perform amplitude adjustment of a corresponding CC on the basis of an amplitude adjustment factor (an amplitude ratio) notified from the transmission-power control unit 3. Then, a synthesizing unit 107 synthesizes the amplitude-adjusted signals of the CCs, and outputs the synthesized, signal to the RF unit 22.

Next, in the RF unit 22, a DAC (Digital to Analog Converter) 111 converts the digital synthesized signal received from the synthesizing unit 107 into an analog signal. An orthogonal transformer 112 up-converts the received signal to a radio frequency band. Then, a PA (Power Amplifier) 113 amplifies the input signal on the basis of total power of all CCs notified from the transmission-power control unit 3, and transmits the amplified signal from the antenna 5.

Figure 7:
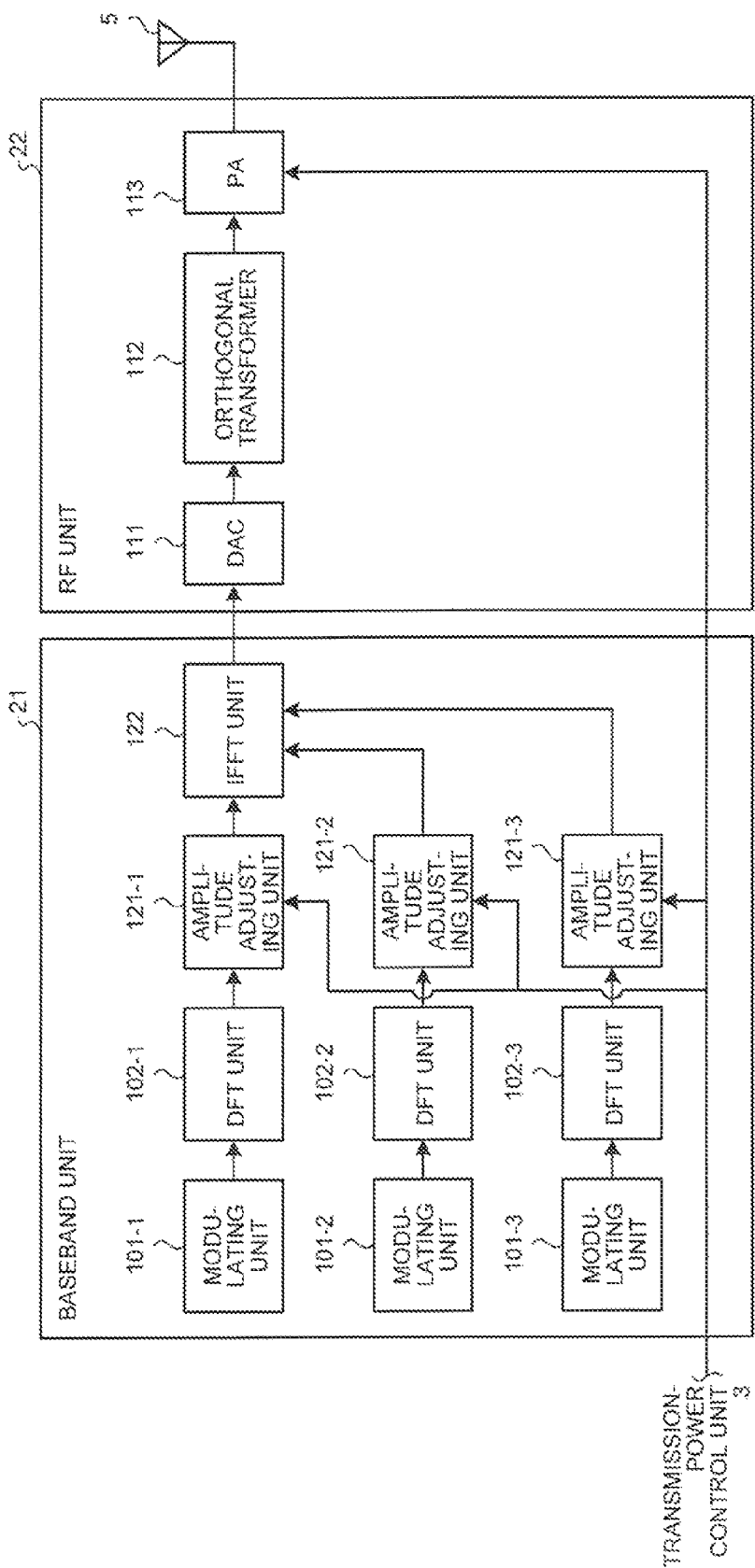
FIG. 7 is a diagram illustrating an example of configurations of the baseband unit and the RF unit.

FIG. 7 is a diagram illustrating a different configuration, example of the baseband unit 21 and the RF unit 22 from FIG. 6. Incidentally, the same component as in FIG. 6 is assigned the same reference numeral, and description of the component is omitted.

In the baseband unit 21 illustrated in FIG. 3, amplitude adjusting units 121-1, 121-2, and 121-3 perform amplitude adjustment of a frequency domain signal of a corresponding CC on the basis of an amplitude adjustment; factor (an amplitude ratio) notified from the transmission-power control unit 3. Then, an IFFT unit 122 having the large FFT (Fast Fourier Transform) size enough to cover all CCs synthesizes amplitude-adjusted signals of the CCs in a frequency domain, and outputs the synthesized signal to the RF unit 22.

As described above, in the present embodiment, signals of CCs are synthesized by using either of the baseband units 21 described above. Incidentally, in FIGS. 6 and 7, there is described a case where signals of three CCs are synthesized by the baseband unit 21; however, the present invention is not limited to this. For example, signals of two CCs or signals of four or more CCs can be synthesized.

Subsequently, before explaining a wireless communication method in the wireless communication system according to the present embodiment, we explain a prerequisite wireless communication method.

Figure 8:
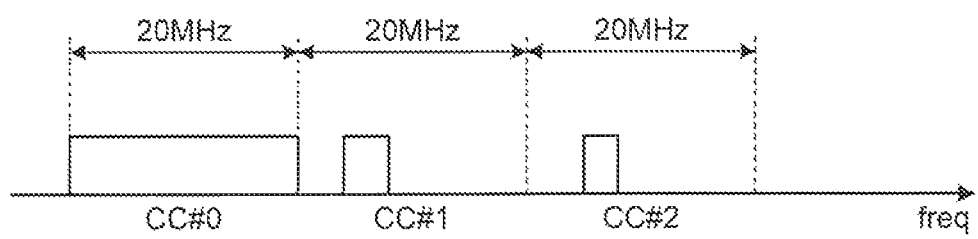
FIG. 8 is a diagram illustrating an example of frequency scheduling in the carrier aggregation.

FIG. 8 is a diagram illustrating an example of frequency scheduling in CA. In an uplink of CA (CC #0, CC #1, and CC #2 with a bandwidth of 20 MHz), each CC is a DFT-S (Spread)-OFDM signal; therefore, the mobile station transmits a multicarrier signal that, multiple DFT-S-OFDM signals are multiplexed. At this time, the mobile station is assigned a frequency resource of good radio quality with respect to each CC by frequency scheduling. Therefore, for example, as illustrated in FIG. 8, an amount of frequency resource assigned to each CC may differ among the CCs (see CC #0, CC #1, and CC #2 in FIG. 8). Incidentally, the communication quality is measured by the base station on the basis of an SRS transmitted from the mobile station. The base station performs frequency scheduling on the basis of a result of the measurement. Furthermore, an amount of frequency resource assigned by the frequency scheduling is controlled in units of a "resource block".

Figure 9:
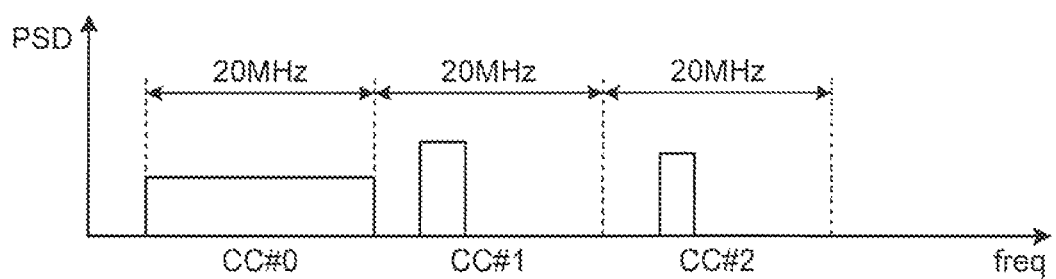
FIG. 9 is a diagram illustrating an example where transmission power control is implemented with respect to each component carrier.

Furthermore, in CC, independent transmission power control (TPC) with respect to each CC can be applied. FIG. 9 is a diagram illustrating an example where transmission power control is implemented with respect to each CC. The mobile station performs a process of increasing or reducing transmission power of each CC in accordance with a TPC command notified from the bass station. Therefore, as illustrated in FIG. 9, a transmission power value and power spectral density (PSD) of each CC may differ among the CCs. Incidentally, in FIG. 9, the horizontal axis indicates frequency, the vertical axis indicates PSD, and an area of an enclosed part indicates a transmission power value of each CC.

Subsequently, problems in the wireless communication method illustrated in FIGS. 8 and 9 are explained. The mobile station calculates a transmission power value of each CC on the basis of a TPC command transmitted from the base station. Then, the mobile station converts a difference in transmission power between CCs info an amplitude ratio, and adjusts the amplitude of each CC on the basis of the amplitude ratio.

Figure 10A:
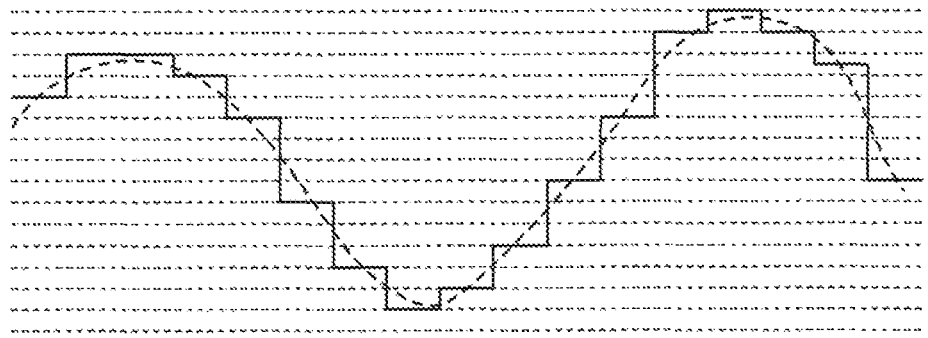
FIG. 10A is a diagram illustrating an example of a signal when amplitude adjustment is performed based on a component carrier having the maximum transmission power value.
Figure 10B:
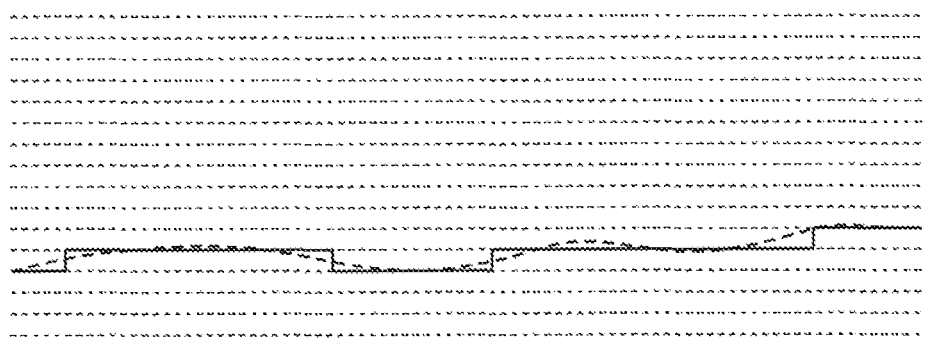
FIG. 10B is a diagram illustrating an example of a signal when the amplitude adjustment is performed based on the component carrier having the maximum transmission power value.

Therefore, for example, when there is a large difference in transmission power value between CCs, if the mobiles station performs the amplitude adjustment based on a CC having the maximum transmission power value, an amplitude level of a signal of a CC having a small transmission power value is lowered, and a quantization error is increased. FIGS. 10A and 10B are diagrams illustrating an example of signals when the amplitude adjustment is performed based on a CC having the maximum transmission power value; specifically, FIG. 10A illustrates an example of a signal of the CC having the maximum transmission power value, and FIG. 10B illustrates an example of a signal of a CC having a small transmission power value. Here, a solid waveform is a quantized signal, and a dotted waveform is an ideal signal. In this manner, when the mobile station performs the amplitude adjustment based on a CC having the maximum transmission power value, the signal quality of a CC having a small transmission power value may be degraded.

Figure 11A:
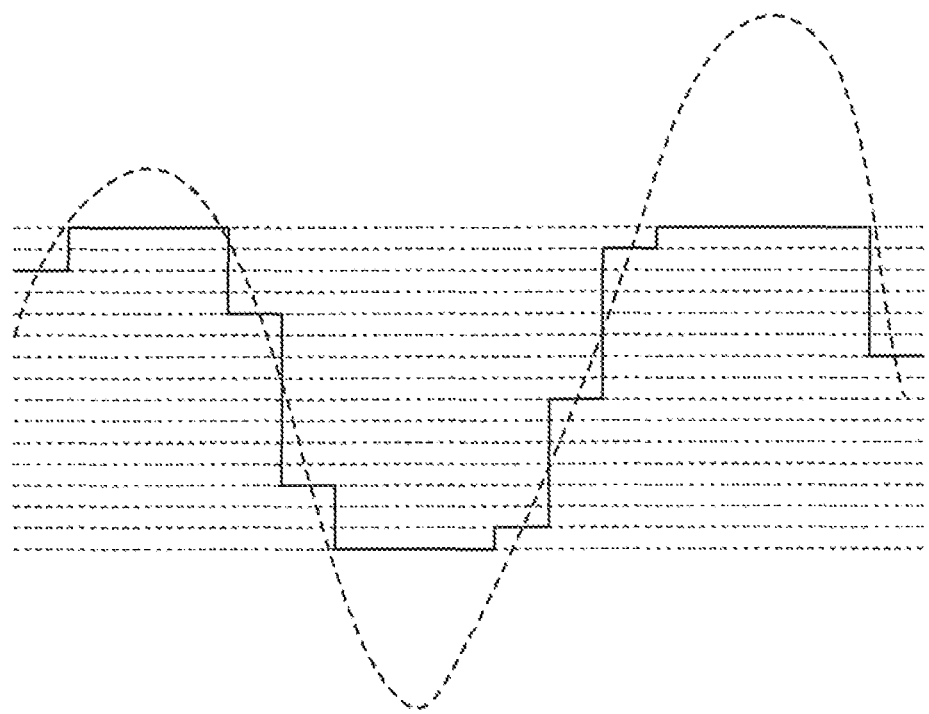
FIG. 11A is a diagram illustrating an example of a signal when amplitude adjustment is performed based on a component carrier having the minimum transmission power value.
Figure 11B:
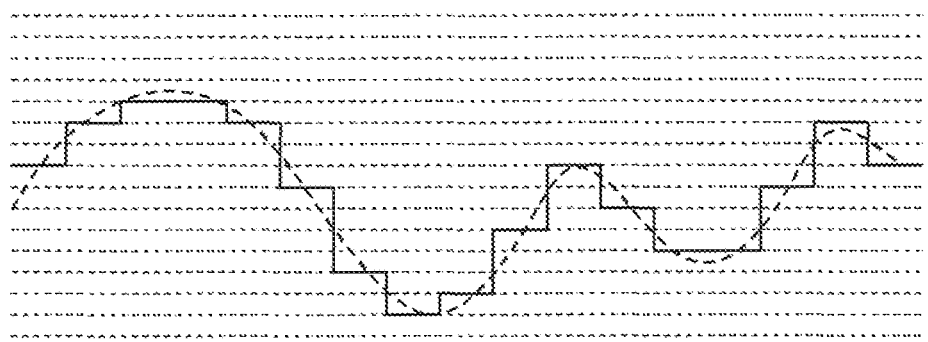
FIG. 11B is a diagram illustrating an example of a signal when the amplitude adjustment is performed based on the component carrier having the minimum transmission power value.

On the other hand, when the mobile station performs the amplitude adjustment based on a CC having the minimum transmission power value to avoid degradation of the signal quality of a CC having a small transmission power value, an amplitude level of a signal of a CC having a large transmission power value gets too high, and the DAC causes overflow. FIGS. 11A and 11B are diagrams illustrating an example of signals when the amplitude adjustment is performed based on a CC having the minimum transmission power value; specifically, FIG. 11A illustrates an example of a signal of a CC having a large transmission power value, and FIG. 11B illustrates an example of a signal ox the CC having the minimum transmission, power value. The overflow as illustrated in FIG. 11A may cause degradation of the signal quality and unwanted out-of-hand signal interference.

Figure 12A:
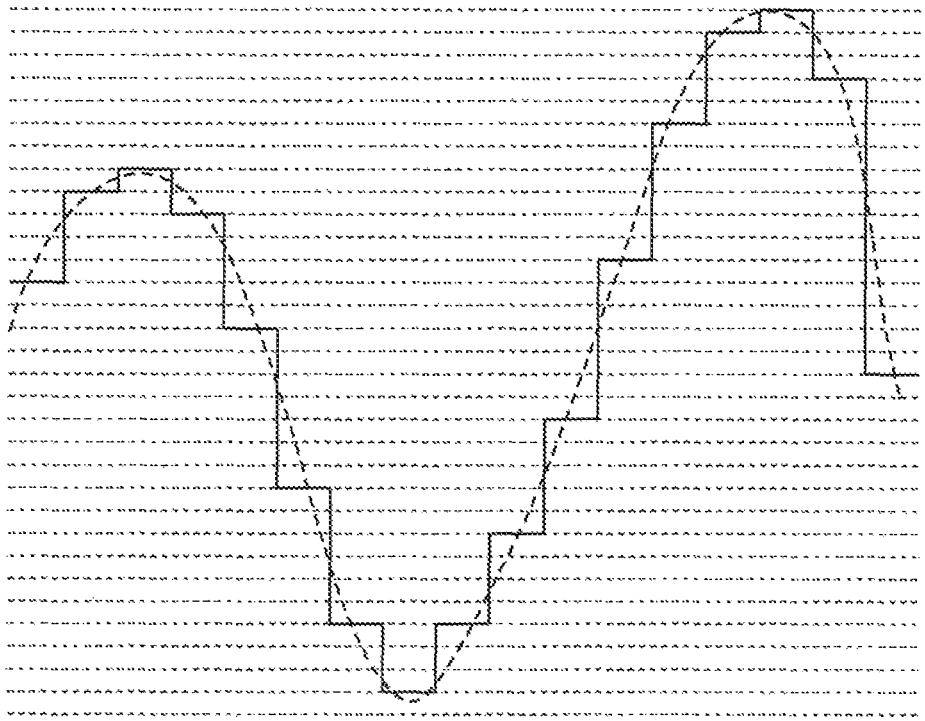
FIG. 12A a diagram illustrating an example of a signal when a quantization bit rate is increased.
Figure 12B:
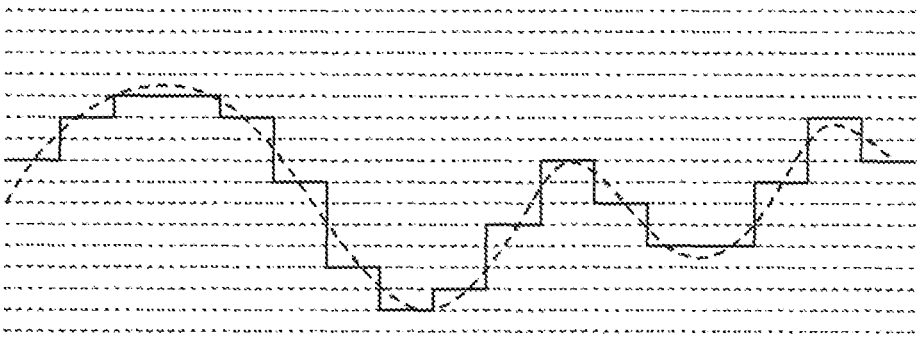
FIG. 12B a diagram illustrating an example of a signal when the quantization bit rate is increased.

Furthermore, measures against the overflow could include a measure to increase a quantization bit rate. FIGS. 12A and 12B are diagrams illustrating an example ox signals when a quantization bit rate is increased (from 4 bits to 5 bits); specifically, FIG. 12A illustrates an example of a signal of a CC having a large transmission power value, and FIG. 12B illustrates an example of a signal of a CC having a small transmission power value. However, while this measure can avoid overflow of the DAC, the circuit scale of the DAC is increased, and further, power consumption is increased.

Incidentally, in the above, there are explained problems in a case where the mobile station performs the digital synthesis in a time domain; also in a case where the mobile station performs the digital synthesis in a frequency domain, similar problems relating to PSD arise.

Consequently, in the present embodiment, a process relating to the transmission power control is devised, thereby avoiding the problems as illustrated in FIGS. 10 (A, B) to 12 (A, B).

Subsequently, the wireless communication method according to the present embodiment is explained. In the present embodiment, the transmission power control is performed, at the initiative of the base station. First, the mobile station transmits information on an allowable maximum power difference $P_{MPD}$ between CCs to the base station. Furthermore, the mobile station transmits limitation mode information indicating either to limit a transmission power value of each CC ($P_{MPD}$ is difference in transmission power) or to limit PSD of a transmission power value of each CC ($P_{MPD}$ is difference in PSD) according to the configuration of the mobile station to the base station. Incidentally, a limitation mode in which a transmission power value of each CC is limited is referred to as an "inter-CC transmission power difference limitation mode", and a limitation mode in which PSD of a transmission power value of each CC is limited is referred to as an "inter-CC PSD difference limitation mode". For example, when the mobile station is configured to perform the digital synthesis in a time domain as in FIG. 6, the mobile station transmits limitation mode information indicating the inter-CC transmission power difference limitation mode to the base station. Furthermore, when the mobile station is configured to perform the digital synthesis in a frequency domain as in FIG. 7, the mobile station transmits limitation mode information indicating the inter-CC PSD difference limitation mode to the base station.

Incidentally, as described above, the limitation mode is uniquely determined according to the configuration of the baseband unit 21 of the mobile station. Therefore, when the mobile station controls transmission power or the basis of a TPC command transmitted from the base station, the mobile station last has to notify the base station of the limitation mode and an allowable maximum power difference between CCs only once. Furthermore, when the mobile station is configured to include both of the baseband units 21 illustrated in FIGS. 6 and 7, the limitation mode can be arbitrarily changed according to the configuration of the baseband unit 21 used in communication.

On the other hand, the base station generates a TEC command on the basis of information on a maximum power difference $P_{MPD}$ between CCs and limitation mode information received from the mobile station. For example, when the limitation mode is the inter-CC transmission power difference limitation mode, the base station generates a TEC command so that difference in transmission power between CCs is within $P_{MPD}$ in comparison of respective transmission power values of CCs. Furthermore, when the limitation mode is the inter-CC PSD difference limitation, mode, the base station generates a TPC command so that difference in PSD between CCs is within $P_{MPD}$ in comparison of respective PSD of CCs.

Figure 13:
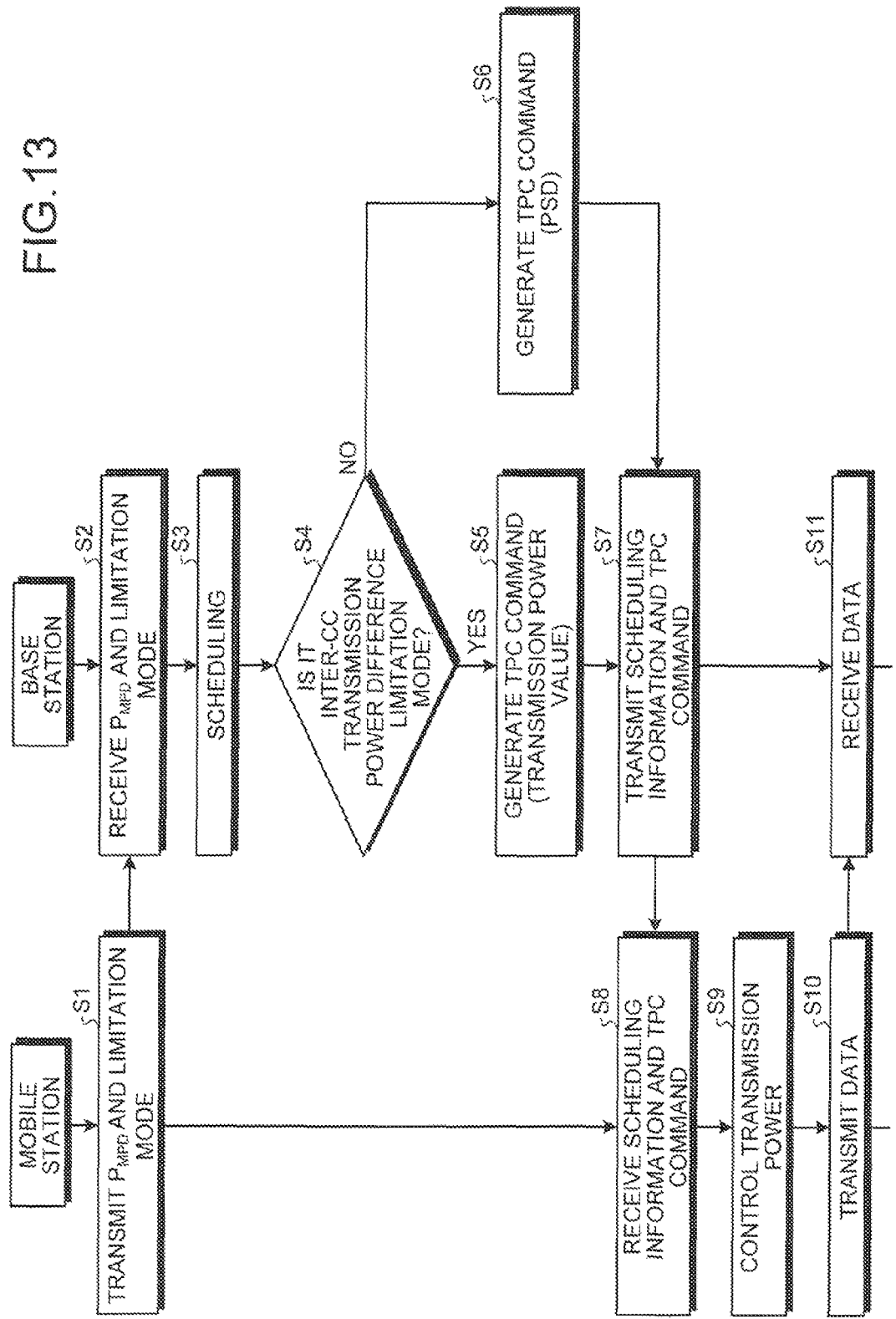
FIG. 13 is a flowchart illustrating an example of a wireless communication method in a wireless communication system according to a first embodiment.

FIG. 13 is a flowchart illustrating an example of the wireless communication method in the wireless communication system according to the first embodiment.

First, in the mobile station, the uplink transmitting unit 2 transmits information on a maximum power difference $P_{MPD}$ between CCs and limitation mode information indicating either the inter-CC transmission power difference limitation mode or the inter-CC PSD difference limitation mode to the base station via the antenna 5 (S1).

In the base station, the receiving unit 61 of the uplink receiving unit 6 notifies the downlink transmitting unit 7 of the information on the maximum power difference $P_{MPD}$ between CCs and limitation mode information received from the mobile station via the antenna 8 (S2). In the downlink transmitting unit 7, the scheduler unit 71 performs scheduling on the basis of the communication quality of each CC, and notifies the transmitting unit 73 of scheduling information (S3). Furthermore, the TPC-command generating unit 72 checks whether information indicated in the limitation mode information transmitted from the mobile station is the inter-CC transmission power difference limitation mode or the inter-CC PSD difference limitation mode (S4). As a result of the checking, when it is the inter-CC transmission power difference limitation mode (Yes at S4), the TPC-command generating unit 72 performs power adjustment so that difference in transmission power between CCs is within $P_{MPD}$ in comparison of respective transmission power value of CCs, and generates a TPC command on the basis of a resort of the adjustment (S5). On the other hand, as a result of the checking, when it is the inter-CC PSD difference limitation mode (No at S4), the TPC-command generating unit 72 performs power adjustment so that difference in PSD between CCs is within $P_{MPD}$ in comparison of respective PSD of CCs, and generates a TPC command on the basis of a result of the adjustment (S6). Then, the transmitting unit 73 transmits the scheduling information and the TPC command to the mobile station via the antenna 9 (S7).

In the mobile station, the receiving unit 11 receives the scheduling information and TPC command transmitted from the base station via the antenna 4 (S8). Then, the receiving unit 11 notifies the uplink transmitting unit 2 of the scheduling information. Consequently, the uplink transmitting unit 2 can assign user data to CCs on the basis of the scheduling information. Furthermore, the receiving unit 11 notifies the transmission-power control unit 3 of the TPC command received from the base station.

In the transmission-power control unit 3, the CC-transmission-power calculating unit 31 calculates a transmission power value of a corresponding CC on the basis of the TPC command, and notifies the amplitude-adjustment-factor calculating unit 32 of a result of the calculation (S9). When the mobile station corresponds to the inter-CC transmission power difference limitation mode, the amplitude-adjustment-factor calculating unit 32 calculates an amplitude adjustment factor from a ratio of respective transmission power values of CCs, and notifies each amplitude adjusting unit of the baseband unit 21 of a result of the calculation (S9). On the other hand, when the mobile station corresponds to the inter-CC PSD difference limitation mode, the amplitude-adjustment-factor calculating unit 32 converts a transmission power value of each CC into PSD, and calculates an amplitude adjustment factor from a ratio of respective PSD of CCs, and then notifies each amplitude adjusting unit of the baseband unit 21 of a result of the calculation (S9). Furthermore, the amplitude-adjustment-factor calculating unit 32 calculates total power of all CCs from, the respective transmission power values of the CCs, and notifies the PA of the PIP unit 22 of a result of the calculation (S9).

For example, in the mobile station corresponding to the inter-CC transmission power difference limitation mode, the baseband unit 21 digitally synthesizes respective amplitude-adjusted user data signals or CCs in a time domain. Than, the BP unit 22 amplifies the southern red user data signal to the total power of all CCs, and transmits the amplified signal, to the base station via the antenna 5 (S10). On the other hand, in the mobile station corresponding to the inter-CC PSD difference limitation mode, the baseband unit 21 digitally synthesizes respective amplitude-adjusted user data signals of CCs in a frequency domain. Then, the RF unit 22 amplifies the synthesized user data signal to the total power of all CCs, and transmits the amplified signal to the bass station via the antenna 5 (S10).

In the base station, the receiving unit 61 receives the user data signal transmitted from the mobile station via the antenna 8 (S11).

In this manner, in the present, embodiment, the mobile station notifies the base station of an allowable maximum power difference between CCs and a limitation mode, and the bass station generates a TPC command so that difference in transmission power (or difference in PSD) between CCs is within the allowable maximum power difference according to the limitation mode. Consequently, transmission power control (TPC) can be made within, a range of a quantization bit rate, and therefore, it is possible to suppress degradation of the signal quality without increasing the circuit scale of the DAC.

Second Embodiment

A wireless communication system, mobile station, base station, and wireless communication method according to a second embodiment are explained. In the first embodiment, the mobile station performs transmission power control on the basis of a TPC command generated so that difference in transmission power (or difference in PSD) between CCs is within the allowable maximum power difference. In the present embodiment. When having received a TPC command from the base station, the mobile station autonomously controls transmission power.

Figure 14:
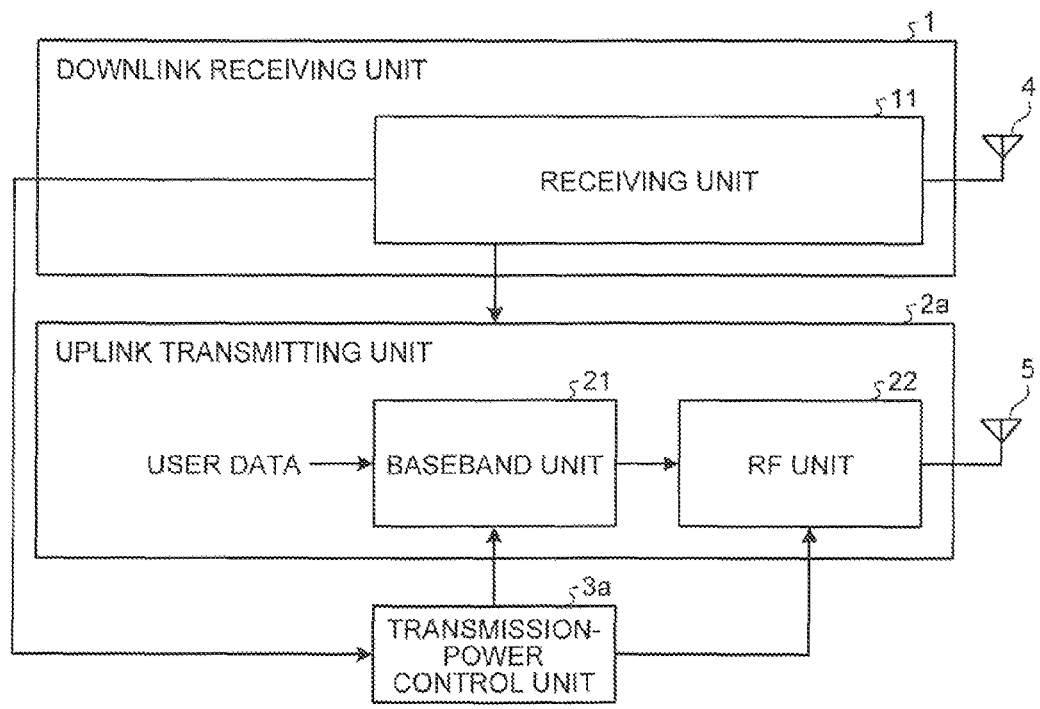
FIG. 14 is a diagram illustrating a configuration example of a mobile station.
Figure 15:
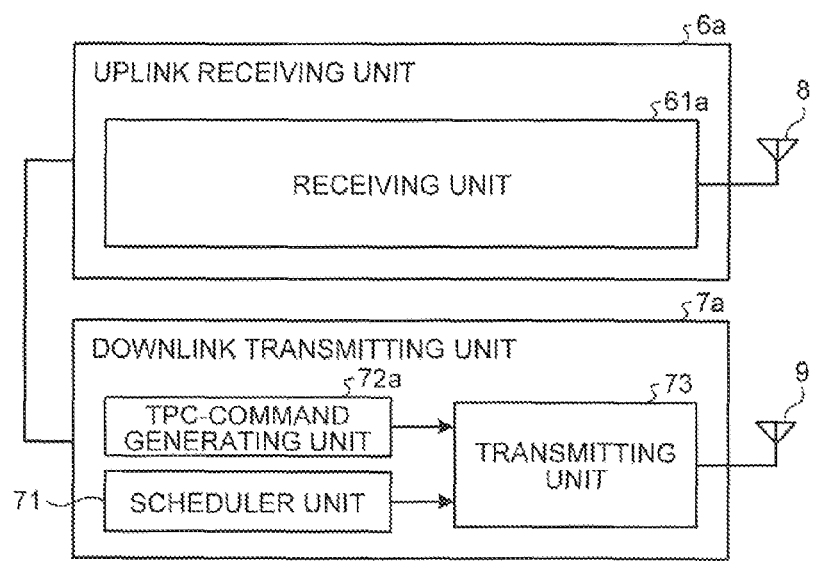
FIG. 15 is a diagram, illustrating a configuration example of a base station.

FIG. 14 is a diagram illustrating a configuration example of the mobile station in the wireless communication system, and FIG. 15 is a diagram illustrating a configuration example of the base station in the wireless communication system. Incidentally, for convenience of the explanation, the configuration examples of the mobile station and the base station represent a list of components involved in a process in the present embodiment, and are not representation of all functions of the mobile station and the base station. Furthermore, the same component as in the above-described first embodiment is assigned the same reference numeral, and description of the component is omitted. Moreover, in the base station illustrated in FIG. 15, a receiving unit 61a of an uplink receiving unit 6a performs a process of receiving data transmitted from the mobile station, and a TPC-command generating unit 72a of a downlink transmitting unit 7a performs a known TPC-command generating process regardless of the limitation mode.

In FIG. 14, the mobile station includes the downlink receiving unit 1, an uplink transmitting unit 2a, and a transmission-power control unit 3a. The uplink transmitting unit 2a includes the baseband unit 21 and the RF unit 22, and encodes user data assigned to given CCs on the basis of scheduling information and transmits the encoded user data to the base station via the antenna 5.

Figure 16:
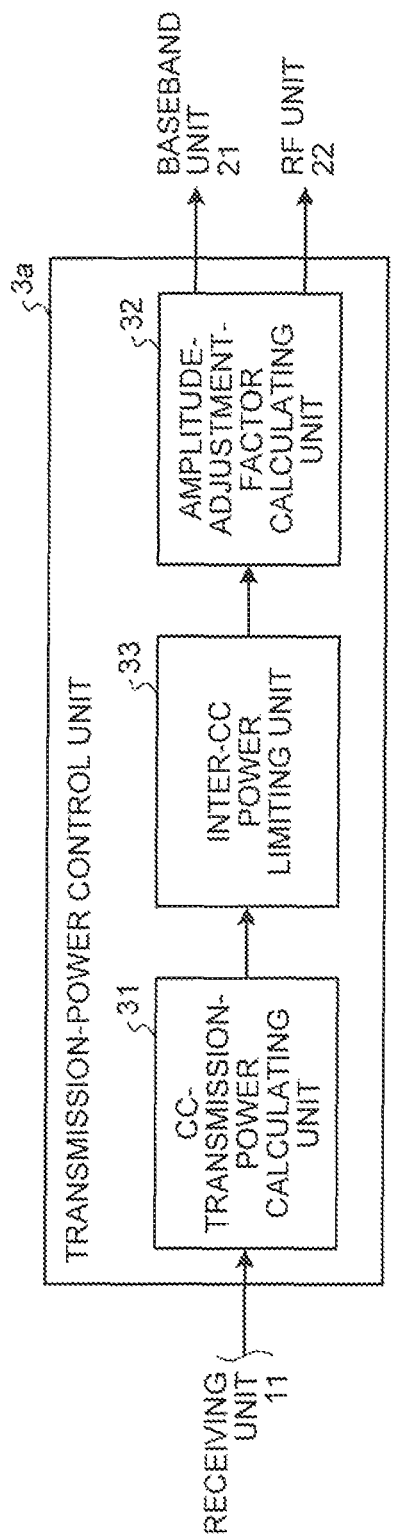
FIG. 16 is a diagram illustrating a configuration example of a transmission-power control unit.

When having notified of a TPC command, from the base station, the transmission-power control unit 3a autonomously controls transmission power. FIG. 16 is a diagram illustrating a configuration example of the transmission-power control unit 3a. In FIG. 16, the transmission-power control unit 3a includes the CC-transmission-power calculating unit 31, an inter-CC power limiting unit 33, and the amplitude-adjustment-factor calculating unit 32. The inter-CC power limiting unit 33 adjusts (limits) a transmission power value of each CC or PSD of each CC on the basis of an allowable maximum power difference $P_{MPD}$ between CCs. Incidentally, in the above-described mobile station, the downlink receiving unit 1, the uplink transmitting unit 1a, and the transmission-power control unit 3a can be composed of, for example, a CPU, an FPGA, and a memory, ere.

Figure 17:
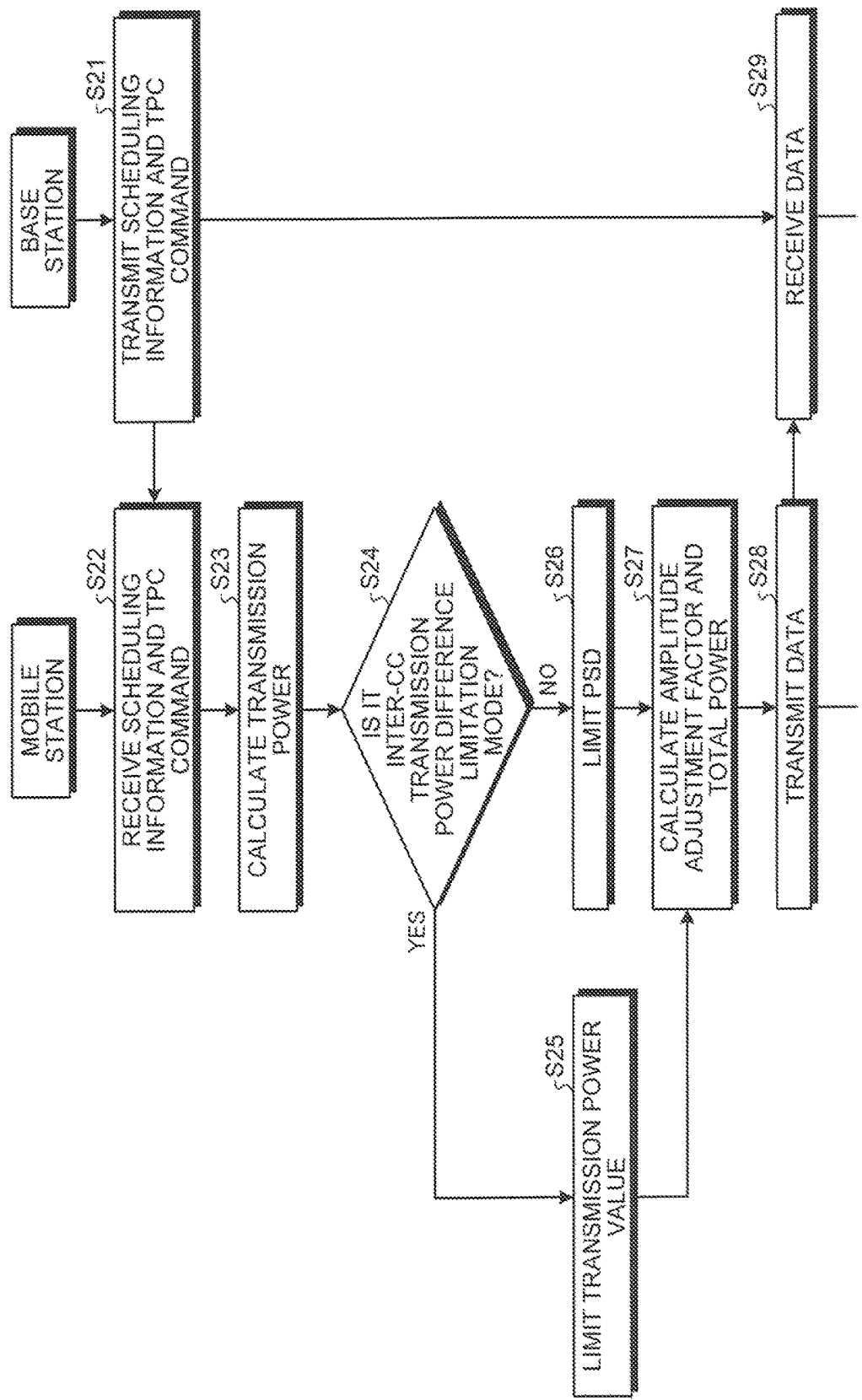
FIG. 17 is a flowchart illustrating an example of a wireless communication method in a wireless communication system according to a second embodiment.

Here, the wireless communication method according to the present embodiment is explained in accordance with a flowchart. FIG. 17 is a flowchart illustrating an example of the wireless communication method in the wireless communication system according to the second embodiment.

First, in the base station, the transmitting unit 73 of the downlink transmitting unit 7a transmits a TPC command generated by the TPC-command generating unit. 72a and scheduling information generated by the scheduler unit 71 to the mobile station via the antenna 9 (S21).

In the mobile station, the receiving unit 11 of the downlink receiving unit 1 receives the scheduling information and TPC command, transmitted from the base station via the antenna 4 (S22). Then, the receiving unit 11 notifies the uplink transmitting unit 2a of the scheduling information. Consequently, the uplink transmitting unit 2a can assign user data to CCs on the basis of the scheduling information. Furthermore, the receiving unit 11 notifies the transmission-power control unit 3a of the TPC command received from the base station.

In the transmission-power control unit 3a, the CC-transmission-power calculating unit 31 calculates a transmission power value $P_i$ ($i=0, 1, \ldots, N_{CC}-1$) of a corresponding CC on the basis of the notified TPC command (S23). Then, the CC-transmission-power calculating unit 31 notifies the inter-CC power limiting unit 33 of a result of the calculation. Incidentally, $P_i$ denotes a transmission power value of the i-th CC, and $N_{cc}$ denotes the number of CCs.

Then, the inter-CC power limiting unit 33 determines whether the limitation mode corresponding to the mobile station is the inter-CC transmission power difference limitation mode or the inter-CC PSD difference limitation mode (S24). As a result, when it is the inter-CC transmission power difference limitation mode (Yes at S24), the inter-CC power limiting unit 33 first finds a minimum value $P_{min}$ from respective transmission power values $P_i$ of CCs. Then, when a transmission power value $P_i$ of the i-th CC exceeds "$P_{min}+P_{MPD}$" which is a value obtained by adding the maximum power difference $P_{MPD}$ to the minimum value $P_{min}$, the inter-CC power limiting unit 33 limits $P_i(=P_i^{(act)})$ to "$P_{min}+P_{MPD}$" (S25). Incidentally, when a transmission power value $P_i$ of the i-th CC does not exceed "$P_{min}+P_{MPD}$", the inter-CC power limiting unit 33 does not limit the transmission power value $P_i$. Namely, the inter-CC power limiting unit 33 executes a process of the following equation (1).

$$P_{min} = \min_{i \in \{0,1,\ldots,N_{CC}-1\}} P_i$$
$$P_i^{(act)} = \min\{P_i, P_{min} + P_{MPD}\} \quad (1)$$

Incidentally, the above equation (1) can also foe expressed by the following equation (2).

$$P_i^{(act)} = \min\{P_i, \min_{i \in \{0,1,\ldots,N_{CC}-1\}} P_i + P_{MPD}\} \quad (2)$$

On the other hand, as a result of the determination at 324, when it is the inter-CC PSD difference limitation mode (No at S24), the inter-CC power limiting unit 33 first converts a transmission power value $P_i$ of each CC into a value of power per resource block (an i-th resource block number is denoted by $M_i$). The converted value (PSD) of each CC is "$P_i - 10 \log_{10} M_i$". Then, the inter-CC power limiting unit 33 finds a minimum value $P_{min}'$ from respective PSD of CCs. Then, when PSD of the i-th CC exceeds "$P_{min}' + P_{MPD}$" which is a value obtained by adding the maximum power difference $P_{MPD}$ to the minimum value $P_{min}'$, the inter-CC power limiting unit 33 limits the PSD of the CC to "$P_{min}' + P_{MPD}$". Incidentally, when PSD of the i-th CC does not exceed "$P_{min}' + P_{MPD}$", the inter-CC power limiting unit 33 does not limit the PSD. After that, the inter-CC power limiting unit 33 converts the obtained PSD of each CC into a transmission power value $P_i(=P_i^{(act)})$ (S26). Namely, the inter-CC power limiting unit 33 executes a process of the following equation (3).

$$P_{min}' = \min_{i \in \{0,1,\ldots,N_{CC}-1\}}(P_i - 10 \log_{10} M_i)$$
$$P_i^{(act)} = \min\{P_i - 10 \log_{10} M_i, P_{min}' + P_{MPD}\} + 10 \log_{10} M_i \quad (3)$$

Incidentally, the above equation (3) can also be expressed by the following equation (4).

$$P_i^{(act)} = \min\{P_i - 10 \log_{10} M_i, \min_{i \in \{0,1,\ldots,N_{CC}-1\}}(P_i - 10 \log_{10} M_i) + P_{MPD}\} + 10 \log_{10} M_i \quad (4)$$

Then, when the mobile station corresponds to the inter-CC transmission power difference limitation mode, the amplitude-adjustment-factor calculating unit 32 of the transmission-power control unit 3a calculates an amplitude adjustment factor from a ratio of respective transmission power values of CCs, and notifies each amplitude adjusting unit of the baseband unit 21 of a result of the calculation (S27). On the other hand, when the mobile station corresponds to the inter-CC PSD difference limitation mode, the amplitude-adjustment-factor calculating unit 32 calculates an amplitude adjustment factor from a ratio of respective PSD of CCs, and notifies each amplitude adjusting unit of the baseband unit 21 of a result of the calculation (S27). Furthermore, the amplitude-adjustment-factor calculating unit 32 calculates total power of all CCs from the respective transmission power values of the CCs, and notifies the PA of the RF unit 22 of a result of the calculation (S27).

For example, in she mobile station corresponding to the inter-CC transmission power difference limitation mode, the baseband unit 21 digitally synthesizes respective amplitude-adjusted user data signals of CCs in a time domain. Then, the RF unit 22 amplifies the synthesized user data signal to the total power of all CCs, and transmits the amplified signal to the base station via the antenna 5 (S28). On the other hand, in the mobile station corresponding to the inter-CC PSD difference limitation mode, the baseband unit 21 digitally synthesizes respective amplitude-adjusted user data signals of CCs in a frequency domain. Then, the RF unit 22 amplifies the synthesized user data signal to the total power of all CCs, and transmits the amplified signal to the base station, via the antenna 5 (S28).

In the base station, the receiving unit 61a of the uplink, receiving unit 6a receives the user data signal transmitted from the mobile station via the antenna 8 (S29).

Incidentally, just like in the first embodiment, the mobile station can notify one base station of information on an allowable maximum power difference $P_{MPD}$ between CCs and limitation mode information (the inter-CC transmission power difference limitation mode or the inter-CC PSD difference limitation mode) according to the configuration of the mobile station.

In this manner, in the present embodiment, when having received a TPC command from the base station, the mobile station autonomously controls transmission power so that difference in transmission power (or difference in PSD) between CCs is within the allowable maximum power difference according to the limitation mode of the mobile station. Consequently, transmission power control (TPC) can be made within a range of a quantization bit rate, and therefore, it is possible to suppress degradation of the signal quality without increasing the circuit scale of the DAC.

Third Embodiment

A wireless communication system, mobile station, base station, and wireless communication method according to a third embodiment are explained. In the first embodiment, the mobile station notifies the base station of an allowable maximum power difference between CCs and a limitation mode, and the bass station transmits a TPC command generated according to the limitation mode to the mobile station. In the present embodiment, we consider a process in a case where the mobile station notifies the base station of an allowable maximum power difference between CCs, and does not notify the base station of a limitation mode.

Figure 18:
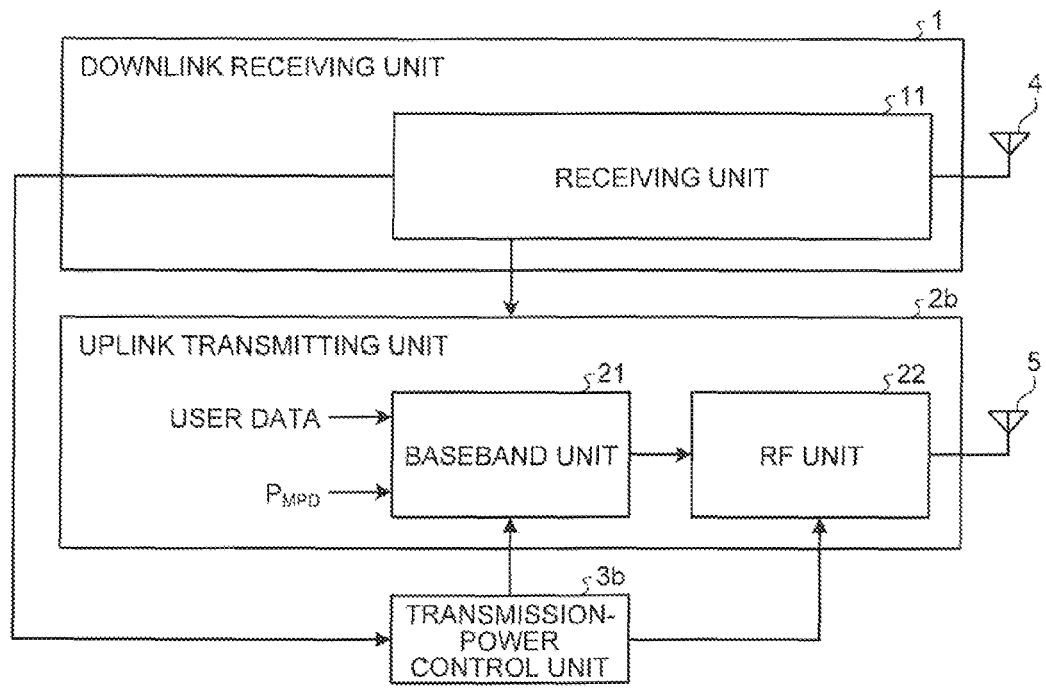
FIG. 18 is a diagram illustrating a configuration example of a mobile station.
Figure 19:
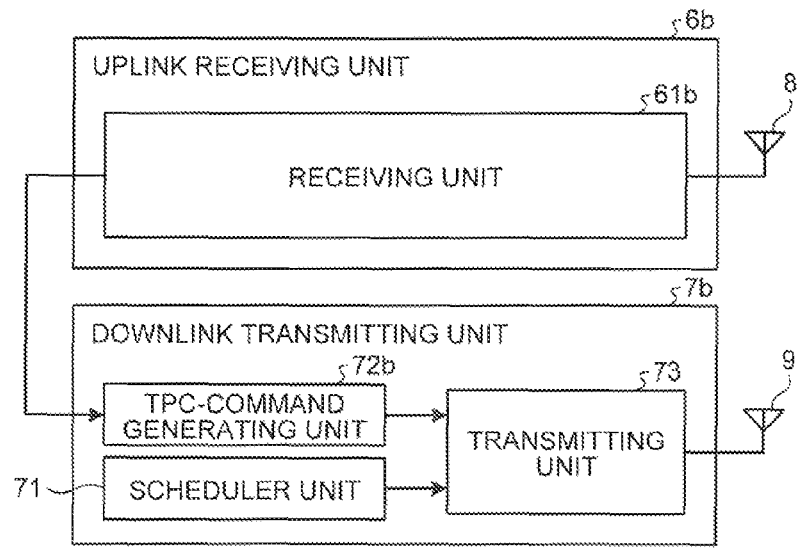
FIG. 19 is a diagram illustrating a configuration example of a base station.

FIG. 18 is a diagram illustrating a configuration example of the mobile station in the wireless communication system, and FIG. 19 is a diagram illustrating a configuration example of the base station in the wireless communication system. Incidentally, for convenience of the explanation, the configuration examples of the mobile station and the base station represent a list of components involved in the process in the present embodiment, and are not representation, of all functions of the mobile station and the base station. Furthermore, the same component as in the above-described, first embodiment is assigned the same reference numeral, and description of the component is omitted.

In FIG. 18, the mobile station includes the downlink receiving unit 1, an uplink transmitting unit 2b, and a transmission-power control unit 3b. The uplink transmitting unit 2b includes the baseband unit 21 and the RF unit 22, and encodes user data assigned to given CCs on the basis of scheduling information and a maximum power difference $P_{MPD}$ between CCs and transmits the encoded, data to the base station via the antenna 5.

The transmission-power control unit 3b controls transmission power on the basis of a TPC command (corresponding to first and second. TPC commands to be described below) notified from the base station. FIG. 20 is a diagram illustrating a configuration example of the transmission-power control unit 3b. In FIG. 20, the transmission-power control unit 3b includes a TPC-command identifying unit 34, the CC-transmission-power calculating unit 31, and the amplitude-adjustment-factor calculating unit 32. The TPC-command identifying unit 34 identifies a TPC command corresponding to the configuration of the baseband unit 21 of the mobile station from first and second TPC commands transmitted from the base station, and notifies the CC-transmission-power calculating unit 31 of the identified TPC command. Incidentally, in the above-described mobile station, the downlink receiving unit 1, the uplink transmitting unit 2b, and the transmission-power control unit 3b can be composed of, for example, a CPU, an FPGA, and a memory, etc.

In FIG. 19, the base station includes an uplink receiving unit 6b and a downlink transmitting unit 7b. In the uplink receiving unit 6b, a receiving unit 61b receives a maximum power difference $P_{MPD}$ between CCs transmitted from the mobile station via the antenna 8, and notifies the downlink transmitting unit 7b of the decoded maximum power difference between CCs. In the downlink transmitting unit 7b, a TPC-command generating unit 72b generates a first TPC command corresponding to the inter-CC transmission power difference limitation mode (a mode in which a transmission power value is limited) on the basis of the decoded maximum power difference $P_{MPD}$ between CCs. At the same time, the TPC-command generating unit 72b generates a second TPC command corresponding to the inter-CC PSD difference limitation mode (a mode in which PSD is limited) on the basis of the decoded maximum power difference PSD between CCs. Then, the TPC-command generating unit 72b notifies the transmitting unit 73 of the generated TPC commands. Incidentally, in the base station, the uplink receiving unit 6b and the downlink transmitting unit 7b can be composed of, for example, a CPU, an FPGA, and a memory, etc.

Here, the wireless communication method, according to the present embodiment is explained in accordance with a flowchart. FIG. 21 is a flowchart illustrating an example of the wireless communication method in the wireless communication system according to the third embodiment.

First, in the mobile station, the uplink transmitting unit 2b transmits information on a maximum power difference $P_{MPD}$ between CCs to the base station via the antenna 5 (S31).

In the base station, the receiving unit 61b of the uplink receiving unit 6b notifies the downlink transmitting unit 7b of the information on the maximum power difference between CCs received from, the mobile station via the antenna 8 (S32). In the downlink transmitting unit 7b, the scheduler unit 71 performs scheduling on the basis of the communication quality of each CC, and notifies the transmitting unit 73 of scheduling information (S3).

Next, the TPC-command generating unit 72b of the base station generates a TPC command so that difference in transmission power between CCs is within $P_{MPD}$ in comparison of respective transmission power values of CCs (S33). Namely, here, the TPC-command generating unit 72b generates a first. TPC command corresponding to the inter-CC transmission power difference limitation mode. Then, the TPC-command generating unit 72b notifies the transmitting unit 73 of the first TPC command, and first identification information for identifying the first TPC command, to be associated with each other (S33).

At the same time, the TPC-command generating unit 72b generates a TPC command so that difference in PSD between CCs is within $P_{MPD}$ in comparison of respective PSD of CCs (S34). Namely, here, the TPC-command generating unit 72b generates a second TPC command corresponding to the inter-CC PSD difference limitation mode. Then, the TPC-command generating unit 72b notifies the transmitting unit 73 of the second TPC command and second identification information for identifying the second TPC command to be associated with each other (S34).

The transmitting unit 73 transmits the scheduling information, the TPC commands, and the respective identification information associated with the TPC commands to the mobile station via the antenna 9 (S35). Incidentally, the first identification information and the second identification, information are known information that the mobile station and the base station nave known in advance.

In the mobile station, the receiving unit 11 receives the scheduling information, the TPC commands, and the respective identification information associated with the TPC commands transmitted from the base station via the antenna 4 (S36). Then, the receiving unit 11 notifies the uplink transmitting unit 2b of the scheduling information. Consequently, the uplink transmitting unit 2b can assign user data to CCs en the basis of the scheduling information. Furthermore, the receiving unit 11 notifies the transmission-power control unit 3b of the TPC commands and the respective identification information associated with the TPC commands.

In the transmission-power control unit 3b, the TPC-command identifying unit 34 detects a TPC command associated with identification information corresponding to the limitation mode of the mobile station on the basis of the notified identification information, and notifies the CC-transmission-power calculating unit 31 of the TPC command (S37). The CC-transmission-power calculating unit 31 calculates a transmission power value of a corresponding CC on the basis of the notified TPC command, and notifies the amplitude-adjustment-factor calculating unit 32 of a result of the calculation (S37). When the mobile station corresponds to the inter-CC transmission power difference limitation mode, the amplitude-adjustment-factor calculating unit 32 calculates an amplitude adjustment factor from a ratio of respective transmission power values of CCs, and notifies each amplitude adjusting unit of the baseband, unit 21 of a result of the calculation (S37). On the other hand, when the mobile station corresponds to the inter-CC PSD difference limitation mode, the amplitude-adjustment-factor calculating unit 32 converts a transmission power value of each CC into PSD, and calculates an amplitude adjustment factor from a ratio of respective PSD of CCs, and then notifies each amplitude adjusting unit of the baseband unit 21 of a result of the calculation (S37). Furthermore, the amplitude-adjustment-factor calculating unit 32 calculates total power of all CCs from the respective transmission power values of the CCs, and notifies the PA of the RF unit 22 of a result of the calculation (S37). After that, the mobile station, transmits data to the base station in the same operation as in the first embodiment.

In this manner, in the present embodiment, first, the mobile station notifies the base station of an allowable maximum power difference between CCs. Next, the base station generates a first TPC command so that difference in transmission power between CCs is within the allowable maximum power difference, and at the same time generates a second TPC command so that difference in PSD between CCs is within the allowable maximum power difference. Then, the mobile station controls transmission power using a TPC command corresponding to the limitation mode of the mobile station (the first or second TPC command). Consequently, transmission power control (TPC) can be made within a range of a quantization bit rate, and therefore, it is possible to suppress degradation of the signal quality without increasing the circuit scale of the DAC.

Furthermore, in the present embodiment, the base station transmits identification information for identifying each TPC command to be associated with the TPC command. Consequently, the mobile station side can certainly detect a TPC command corresponds to the limitation mode of the mobile station.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

According to one aspect of a wireless communication system disclosed in the present application, it is possible to suppress degradation of the signal quality without increasing the circuit scale.

What is claimed is:

1. A wireless communication system capable of wireless communication between a mobile station and a base station by using multiple frequency bands at the same time, wherein
the mobile station includes:
   a baseband unit that synthesizes a plurality of signals of the multiple frequency bands;
   an uplink transmitting unit that transmits to the base station allowable power difference between frequency bands and mode information indicating an object of power limitation which differs depending on whether the baseband unit synthesizes a plurality of signals of frequency domain or a plurality of signals of time domain, the object of power limitation being a transmission power value when the baseband unit is configured to synthesize the signals of time domain obtained by performing the inverse Fourier transform on the signals of frequency domain, the object of power limitation being a power spectral density of the transmission power value when the baseband unit is configured to synthesize the signals of frequency domain by performing the inverse Fourier transform having a size to cover all frequency of the signals of frequency domain; and
   a transmission-power control unit that controls transmission power based on a transmission power control command received from the base station, and
the base station includes:
   a generating unit that generates a transmission power control command to limit difference in the transmission power value between the frequency bands within the allowable power difference when the mode information indicates the object of power limitation is the transmission power value, and generates a transmission power control command to limit difference in the power spectral density of the transmission power value between the frequency bands within the allowable power difference when the mode information indicates the object of power limitation is the power spectral density of the transmission power value; and
   a downlink transmitting unit that transmits the transmission power control command to the mobile station.

2. A mobile station capable of transmitting and receiving radio signals by using multiple frequency bands at the same time, the mobile station comprising:
   a baseband unit that synthesizes a plurality of signals of the multiple frequency bands;
   a transmitting unit that transmits to a base station mode information indicating an object of power limitation which differs depending on whether the baseband unit synthesizes a plurality of signals of frequency domain or a plurality of signals of time domain, the object of power limitation being a transmission power value when the baseband unit is configured to synthesize the signals of time domain obtained by performing the inverse Fourier transform on the signals of frequency domain, the object of power limitation being a power spectral density of the transmission power value when the baseband unit is configured to synthesize the signals of frequency domain by performing the inverse Fourier transform having a size to cover all frequency of the signals of frequency domain; and
   a transmission-power control unit that controls transmission power based on a transmission power control command received from the base station, the transmission power control command limiting difference in the transmission power value between the frequency bands within allowable power difference when the mode information indicates the object of power limitation is the transmission power value, and limiting difference in the power spectral density of the transmission power value between the frequency bands within the allowable power difference when the mode information indicates the object of power limitation is the power spectral density of the transmission power value.

3. The mobile station according to claim 2, wherein
the transmitting unit further transmits the allowable power difference between the multiple frequency bands to the base station.

4. A base station capable of transmitting and receiving radio signals by using multiple frequency bands at the same time, the base station comprising:
   a generating unit that generates a transmission power control command based on allowable power difference between frequency bands and mode information indicating an object of power limitation which differs depending on whether a baseband unit of the mobile station synthesizes a plurality of signals of frequency domain or a plurality of signals of time domain, the object of power limitation being a transmission power value when the baseband unit of the mobile station is configured to synthesize the signals of time domain obtained by performing the inverse Fourier transform on the signals of frequency domain, the object of power limitation being a power spectral density of the transmission power value when the baseband unit of the mobile station is configured to synthesize the signals of frequency domain by performing the inverse Fourier transform having a size to cover all frequency of the signals of frequency domain; and
   a transmitting unit that transmits the transmission power control command to the mobile station, wherein
   the generating unit generates a transmission power control command to limit difference in the transmission power value between the frequency bands within the allowable power difference when the mode information indicates the object of power limitation is the transmission power value, and generates a transmission power control command to limit difference in the power spectral density of the transmission power value between the frequency bands within the allowable power difference when the mode information indicates the object of power limitation is the power spectral density of the transmission power value.

5. A wireless communication method in a wireless communication system capable of wireless communication between a mobile station and a base station by using multiple frequency bands at the same time, the wireless communication method comprising:

the mobile station transmitting to the base station allowable power difference between frequency bands and mode information indicating an object of power limitation which differs depending on whether a baseband unit of the mobile station synthesizes a plurality of signals of frequency domain or a plurality of signals of time domain, the object of power limitation being a transmission power value when the baseband unit of the mobile station is configured to synthesize the signals of time domain obtained by performing the inverse Fourier transform on the signals of frequency domain, the object of power limitation being a power spectral density of the transmission power value when the baseband unit of the mobile station is configured to synthesize the signals of frequency domain by performing the inverse Fourier transform having a size to cover all frequency of the signals of frequency domain;

the base station generating a transmission power control command to limit difference in the transmission power value between the frequency bands within the allowable power difference when the mode information indicates the object of power limitation is the transmission power value, generating a transmission power control command to limit difference in the power spectral density of the transmission power value between the frequency bands within the allowable power difference when the mode information indicates the object of power limitation is the power spectral density of the transmission power value and transmitting the generated transmission power control command to the mobile station; and the mobile station controlling transmission power based on the transmission power control command received from the base station.

* * * * *